(12) United States Patent
Cheon et al.

(10) Patent No.: US 11,032,273 B2
(45) Date of Patent: Jun. 8, 2021

(54) METHOD FOR AUTHENTICATING SECRET INFORMATION WHICH PROTECTS SECRET INFORMATION

(71) Applicant: Crypto Lab Inc., Seoul (KR)

(72) Inventors: Junghee Cheon, Seoul (KR); Yongsoo Song, Seoul (KR)

(73) Assignee: Crypto Lab Inc., Seoul (KR)

( * ) Notice: Subject to any disclaimer, the term of this patent is extended or adjusted under 35 U.S.C. 154(b) by 1 day.

(21) Appl. No.: 16/519,865

(22) Filed: Jul. 23, 2019

(65) Prior Publication Data

US 2019/0349362 A1 Nov. 14, 2019

Related U.S. Application Data

(63) Continuation-in-part of application No. PCT/KR2018/005012, filed on Apr. 30, 2018.

(30) Foreign Application Priority Data

Apr. 29, 2017 (KR) .................. 10-2017-0055803
Jul. 26, 2018 (KR) .................. 10-2018-0087340

(51) Int. Cl.
| | | |
|---|---|---|
| *H04L 29/06* | (2006.01) | |
| *H04L 9/08* | (2006.01) | |
| *G06F 17/16* | (2006.01) | |

(52) U.S. Cl.
CPC .......... *H04L 63/0853* (2013.01); *G06F 17/16* (2013.01); *H04L 9/0894* (2013.01)

(58) Field of Classification Search
CPC . H04L 63/08; H04L 63/0853; H04L 63/0861; H04L 9/0861; H04L 9/0894;

(Continued)

(56) References Cited

U.S. PATENT DOCUMENTS

| | | |
|---|---|---|
| 8,239,685 B2 | 8/2012 | Lee et al. |
| 8,443,201 B2 | 5/2013 | Takahashi et al. |

(Continued)

FOREIGN PATENT DOCUMENTS

| | | |
|---|---|---|
| EP | 1912151 A1 | 4/2008 |
| JP | 2012-022507 A | 2/2012 |

(Continued)

OTHER PUBLICATIONS

Dodis et al., Robust Fuzzy Extractors and Authenticated Key Agreement from Close Secrets, Jul. 22, 2010, New York University, pp. 1-28, Retrieved from https://www.cs.nyu.edu/~dodis/ps/ake-close.pdf (Year: 2010).*

(Continued)

*Primary Examiner* — Roberrt B Leung
*Assistant Examiner* — Adrian Stoica
(74) *Attorney, Agent, or Firm* — Nelson Mullins Riley & Scarborough LLP; Kongsik Kim, Esq.

(57) ABSTRACT

The computer-implemented method for authenticating secret information according to an aspect of the present disclosure, comprises receiving, by an authentication server, $Q\vec{X}$ from a terminal for registering secret information; storing, by the authentication server, the received $Q\vec{X}$; receiving, by the authentication server, a vector $\vec{Z}$ from a terminal for requesting authentication of secret information; calculating, by the authentication server, the inner product of $Q\vec{X}$ and $\vec{Z}$; calculating, by the authentication server, ½(n−the inner product); and determining, by the authentication server, that the authentication is successful if ½(n−the inner product) is within a predetermined value and that the authentication fails otherwise.

12 Claims, 3 Drawing Sheets

(58) Field of Classification Search
CPC ....... H04L 9/3231; G06F 21/31; G06F 21/32; G06F 17/16
See application file for complete search history.

(56) References Cited

U.S. PATENT DOCUMENTS

| | | | |
|---|---|---|---|
| 2008/0178008 A1 | 7/2008 | Takahashi et al. | |
| 2009/0113209 A1 | 4/2009 | Lee et al. | |
| 2015/0100485 A1* | 4/2015 | Skliar | G06Q 20/40145 |
| | | | 705/41 |
| 2018/0241558 A1* | 8/2018 | Takahashi | G06F 16/951 |
| 2020/0279269 A1* | 9/2020 | Wagner | G06Q 20/3823 |

FOREIGN PATENT DOCUMENTS

| | | |
|---|---|---|
| JP | 2013-120580 A | 6/2013 |
| JP | 5439306 B2 | 3/2014 |
| JP | 5852870 B2 | 2/2016 |
| KR | 10-2008-0031622 A | 4/2008 |
| KR | 10-0911594 B1 | 8/2009 |
| KR | 10-0986980 B1 | 10/2010 |
| KR | 10-1010218 B1 | 1/2011 |
| KR | 10-1838008 B1 | 3/2018 |
| WO | 2013-084617 A1 | 6/2013 |

OTHER PUBLICATIONS

Marino et al., A crypto-biometric scheme based on iris-templates with fuzzy extractors,2012, Elsevier Inc., Information Sciences Journal, pp. 91-102 (Year: 2012).*

Mishra et al., A secure user anonymity-preserving biometric-based multi-server authenticated key agreement scheme using smart cards, 2014, Elsevier Inc., Expert Systems with Applications Journal, pp. 8129-8143 (Year: 2014).*

Zhang et al., A secure authentication scheme based on fuzzy extractor, 2014, Computer Modelling & New Technologies, pp. 46-55 (Year: 2014).*

* cited by examiner

METHOD FOR AUTHENTICATING SECRET INFORMATION WHICH PROTECTS SECRET INFORMATION

CROSS-REFERENCE TO RELATED APPLICATION

This application is a continuation-in-part application of International Application No. PCT/KR2018/005012 filed on Apr. 30, 2018, which claims priority to Korean Application No. 10-2017-0055803 filed on Apr. 29, 2017. The present application also claims priority to Korean Application No. 10-2018-0087340 filed on Jul. 26, 2018. These applications are expressly incorporated herein by reference.

TECHNICAL FIELD

The present disclosure relates to a method for authenticating secret information such as biometric information and the like, specifically to a method for authenticating the information without exposing the information.

BACKGROUND

Recently, a variety of methods has been developed for authenticating biometric information such as fingerprint, iris and the like. A person has unique biometric information. Authentication of biometric information is advantageous over the password authentication because there is no need to remember it and there is no risk to be leaked.

However, the authentication of biometric information has different feature from the other authentication methods. The recognized biometric information can be varied whenever it is inputted due to the noise generated in the process of recognizing the biometric information. However, the authentication should not be impeded by the noise. Further, the biometric information cannot be altered unlike password when the information is leaked. Therefore, leakage of the biometric information should be completely blocked.

The encryption methods such as Fuzzy extractor and Inner product encryption have been developed for encrypting biometric information. The authentication using the conventional encryption method has low speed. Further, the length of the ciphertext is long.

SUMMARY

The object of the present disclosure is to provide an authentication method based on a secret information such as biometric information, which is fast and uses short ciphertext.

The computer-implemented method for authenticating secret information according to an aspect of the present disclosure, comprises receiving, by an authentication server, $Q\vec{X}$ from a terminal for registering secret information; storing, by the authentication server, the received $Q\vec{X}$; receiving, by the authentication server, a vector $\vec{Z}$ from a terminal for requesting authentication of secret information; calculating, by the authentication server, the inner product of $Q\vec{X}$ and $\vec{Z}$; calculating, by the authentication server, ½(n−the inner product); and determining, by the authentication server, that the authentication is successful if ½(n−the inner product) is within a predetermined value and that the authentication fails otherwise $\vec{X}$ is a vector of secret information to be registered, the elements of which consist of $\{-1, 1\}^n$. "Q" is a matrix, the elements of which are randomly selected from $\mathbb{Z}_q^{m \times n}$. $\vec{Y}$ is a vector of secret information to be requested for authentication, the elements of which consist of $\{-1, 1\}^n$. $\vec{Z}$ is a vector which satisfies $Q^T\vec{Z} = \vec{Y}$.

$\vec{Z}$ can be a vector which satisfies $Q^T\vec{Z} = \vec{Y} + \vec{e}$. $\vec{e}$ is an error vector, the elements of which are randomly selected from $\mathbb{Z}_q^n$.

The matrix "Q" can be deleted after $Q\vec{X}$ is received by the authentication server.

At least one of $Q\vec{X}$ and $\vec{Z}$ can be encrypted and then is transmitted to the authentication server.

The computer-implemented method for authenticating secret information according to another aspect of the present disclosure comprises receiving, by an authentication server, a first ciphertext "$SK_X$" of a vector "$\vec{X}$" of secret information to be registered from a terminal for registering secret information; storing, by the authentication server, the received first ciphertext; receiving, by the authentication server, a second ciphertext "$C_Y$" of a vector "$\vec{Y}$" of secret information to be requested for authentication from a terminal for requesting authentication of secret information; calculating, by the authentication server, the inner product of "$\vec{X}$" and "$\vec{Y}$"; calculating, by the authentication server, a distance for determining similarity based on the inner product; and determining, by the authentication server, that the authentication is successful if the distance is within a predetermined value and that the authentication fails otherwise.

The elements of "$\vec{X}$" consist of the elements of $Z_p^k$. The first ciphertext "$SK_X$" is defined by $$\begin{bmatrix} I_k \\ S \end{bmatrix} \vec{X} + \vec{u},$$

where the elements of the matrix "S" are randomly selected from $\mathbb{Z}_q^{n \times k}$ and the elements of the vector "$\vec{u}$" are randomly selected from $\mathbb{Z}_q^m$. The elements of "$\vec{Y}$" consist of the elements of $\mathbb{Z}_p^k$. The second ciphertext "$C_Y$" is defined by $$C_Y := \vec{c}_1 = \left(-S^T\vec{a} + \left(\frac{q}{p}\right)\vec{Y} + \vec{e}, \vec{a} \stackrel{\$}{\leftarrow} \mathbb{Z}_q^n\right),$$

$c_0 = -\langle \vec{u}, \vec{c}_1 \rangle + e^*$. $\vec{e}$ and $e^*$ are vectors having elements of real numbers which are small. The elements of $\vec{e}$ are randomly selected from $\mathbb{R}_q^k$ and the elements of $e^*$ are randomly selected from $\mathbb{R}_q$. $\mathbb{Z}_q$ is defined by $\{0, 1, 2, \ldots q-1\}$ and $\mathbb{R}_q$ is defined by $[0,q)$; p, q, k, n and m are positive integers; q>p; and m=k+n.

The elements of the error vectors $\vec{e}$ and $e^*$ can be selected with less distribution such that $|\langle \vec{X}, \vec{e} \rangle + e^*|$ is less than $$\frac{q}{2p}.$$

If the elements of "$\vec{X}$" and "$\vec{Y}$" consist of −1 or +1, the distance for determining similarity can be the hamming distance between "$\vec{X}$" and "$\vec{Y}$" which is ½(k−($\vec{X},\vec{Y}$)).

The elements of the matrix "S" can be randomly selected from the subset of $\mathbb{Z}_q$.

Figure 1:
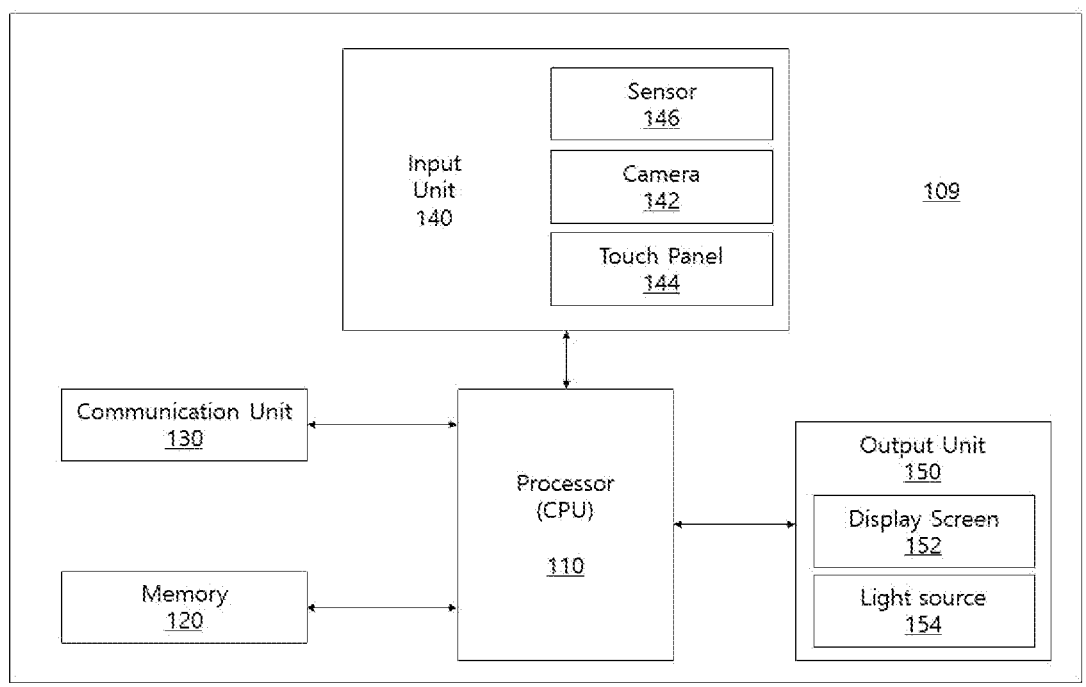
FIG. 1 is one embodiment of an example diagrammatic view of a device architecture which carries out the present disclosure.

It should be understood that the above-referenced drawings are not necessarily to scale, presenting a somewhat simplified representation of various preferred features illustrative of the basic principles of the disclosure. The specific design features of the present disclosure will be determined in part by the particular intended application and use environment

DETAILED DESCRIPTION

Hereinafter, the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

In this specification, the order of each step should be understood in a non-limited manner unless a preceding step must be performed logically and temporally before a following step. That is, except for the exceptional cases as described above, although a process described as a following step is preceded by a process described as a preceding step, it does not affect the nature of the present disclosure, and the scope of rights should be defined regardless of the order of the steps. In addition, in this specification, "A or B" is defined not only as selectively referring to either A or B, but also as including both A and B. In addition, in this specification, the term "comprise" has a meaning of further including other components in addition to the components listed.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The method according to the present disclosure can be carried out by an electronic arithmetic device (referred to as "terminal" or "server" in this specification) such as a computer, tablet, mobile phone, portable computing device, stationary computing device, server computer etc. Additionally, it is understood that one or more various methods, or aspects thereof, may be executed by at least one processor. The processor may be implemented on a computer, tablet, mobile device, portable computing device, etc. A memory configured to store program instructions may also be implemented in the device(s), in which case the processor is specifically programmed to execute the stored program instructions to perform one or more processes, which are described further below. Moreover, it is understood that the below information, methods, etc. may be executed by a computer, tablet, mobile device, portable computing device, etc. including the processor, in conjunction with one or more additional components, as described in detail below. Furthermore, control logic may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

A variety of devices can be used herein. FIG. 1 illustrates an example diagrammatic view of an exemplary device architecture according to embodiments of the present disclosure. As shown in FIG. 1, a device 109 may contain multiple components, including, but not limited to, a processor (e.g., central processing unit (CPU) 110, a memory 120, a wired or wireless communication unit 130, one or more input units 140, and one or more output units 150. It should be noted that the architecture depicted in FIG. 1 is simplified and provided merely for demonstration purposes. The architecture of the device 109 can be modified in any suitable manner as would be understood by a person having ordinary skill in the art, in accordance with the present claims. Moreover, the components of the device 109 themselves may be modified in any suitable manner as would be understood by a person having ordinary skill in the art, in accordance with the present claims. Therefore, the device architecture depicted in FIG. 1 should be treated as exemplary only and should not be treated as limiting the scope of the present disclosure.

The processor 110 is capable of controlling operation of the device 109. More specifically, the processor 110 may be operable to control and interact with multiple components installed in the device 109, as shown in FIG. 1. For instance, the memory 120 can store program instructions that are executable by the processor 110 and data. The process described herein may be stored in the form of program instructions in the memory 120 for execution by the processor 110. The communication unit 130 can allow the device 109 to transmit data to and receive data from one or more external devices via a communication network. The input unit 140 can enable the device 109 to receive input of various types, such as audio/visual input, user input, data input, and the like. To this end, the input unit 140 may be composed of multiple input devices for accepting input of various types, including, for instance, one or more cameras 142 (i.e., an "image acquisition unit"), touch panel 144, microphone (not shown), sensors 146, keyboards, mice, one or more buttons or switches (not shown), and so forth. The term "image acquisition unit," as used herein, may refer to the camera 142, but is not limited thereto. The input devices included in the input 140 may be manipulated by a user. The output unit 150 can display information on the display screen 152 for a user to view. The display screen 152 can also be configured to accept one or more inputs, such as a user tapping or pressing the screen 152, through a variety of mechanisms known in the art. The output unit 150 may further include a light source 154. The device 109 is illustrated as a single component, but the device may also be composed of multiple, separate components that are connected together and interact with each other during use.

The device 109 can thus be programmed in a manner allowing it to generate various exemplary files having column-oriented layouts, and more specifically, to generate various exemplary files having column-oriented layouts that improve data security and query speed by selective encryption to the columns.

In this specification, biometric information is described as an exemplary one of secret information. However, the present disclosure can be applied to the other type of secret information such as password, secret key, privately sensitive information and the like.

Figure 2:
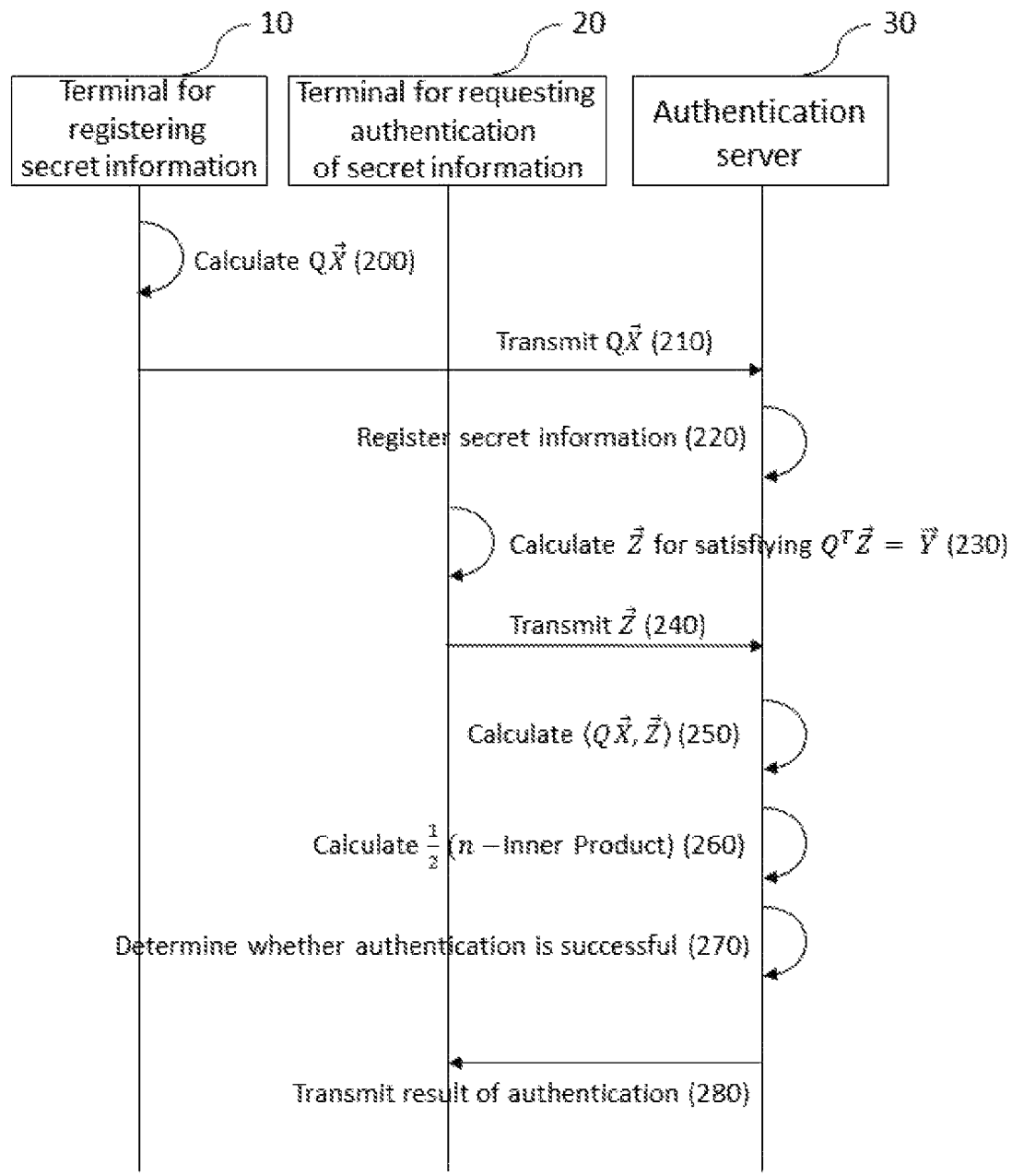
FIG. 2 is a flow chart of authenticating process using secret information according to the present disclosure.

FIG. 2 shows a flow chart of method of authenticating secret information according to the embodiments of the present disclosure. The authentication method can be carried out in the environment comprising a terminal for registering secret information 10, a terminal for requesting authentication of secret information 20, authentication server 30. The terminal for registering secret information 10 and the terminal for requesting authentication of secret information 20 can be the same terminal or separate terminal. In this specification, the present disclosure will be described in the assumption that the two terminals are separate each other. The secret information can be biometric information such as fingerprint.

The terminal for registering secret information 10 transforms the inputted secret information into a vector $\vec{X} \in \{-1, 1\}^n$ having length of "n," the elements of which consist of −1 and 1 and, then calculates $Q\vec{X}$, where Q is a m×n matrix ($Q \in \mathbb{Z}_q^{m \times n}$) (step 200). "m," "n," and "q" are positive integers which are determined according to the security parameters. The numbers are shared with the terminals 10, 20 and the server 30. The matrix Q can be deleted from the terminal 10 after the $Q\vec{X}$ is received by the authentication server 30 or registered in the authentication server 30. The deletion of Q can remove the risk of leakage thereof.

The calculated $Q\vec{X}$ is transmitted to the authentication server 30 (step 210). The transmitted $Q\vec{X}$ can be a kind of ciphertext of the secret information because Q is known only to the terminal for registering secret information 10. The authentication server 30 registers $Q\vec{X}$ as a ciphertext of the secret information (step 220).

Afterwards, a user who wants authentication of secret information provides the terminal for requesting authentication of secret information 20 with his/her secret information through a recognition device of the secret information. The terminal for requesting authentication of secret information 20 transforms the inputted secret information into a vector $\vec{Y} \in \{-1, 1\}^n$ having length of "n," the elements of which consist of −1 and 1.

The terminal for requesting authentication of secret information 20 calculates a vector $\vec{Z}$ which satisfies the following relationship (step 230):

$$Q^T \vec{Z} = \vec{Y}$$

The vector $\vec{Z}$ can be calculated by randomly selecting the elements of "m−n" and then calculating the remaining "n" elements such that the vector satisfies the above relationship.

It is desirable that "m" is greater than "n." "n" is a dimension of the secret information. The security level is determined by "m." The safety level of LWE problem is influenced by "k (=m−n)." It is general that "k" is determined between 500 and 1,000 according to the desired security level and the other factors. For example, "n" can be 2,000 and "m" can be 2,500 when the secret information is iris information.

The calculated $\vec{Z}$ is transmitted to the authentication server 30 (step 240).

The hamming distance $d(\vec{X}, \vec{Y})$ between $\vec{X}$ and $\vec{Y}$ can be calculated by the following equation:

$$d(\vec{X}, \vec{Y}) = \frac{1}{2}(n - \langle \vec{X}, \vec{Y} \rangle) \qquad \text{[Mathematical Equation 1]}$$

where $\langle \vec{X}, \vec{Y} \rangle$ is an inner product of $\vec{X}$ and $\vec{Y}$.

The hamming distance of two vectors means the number of different elements when the elements having the same position in two vectors are compared. For example, the hamming distance of the vector "1100" and the vector "1000" is "1," and the hamming distance of the vector "1111" and the vector "1100" is "2." That is, the less hamming distance of two vectors which are transformed from two inputted secret information respectively is, the closer the two inputted secret information are.

The authentication server 30 calculates the inner product of $Q\vec{X}$ that is the registered ciphertext of the secret information earlier and $\vec{Z}$ that is received from the terminal for requesting authentication of secret information 20 (step 250). The inner product satisfies the following relationship:

$$\langle Q\vec{X}, \vec{Z} \rangle = \langle \vec{X}, Q^T \vec{Z} \rangle = \langle \vec{X}, \vec{Y} \rangle \qquad \text{[Mathematical Equation 2]}$$

Therefore, the hamming distance $d(\vec{X}, \vec{Y})$ of $\vec{X}$ and $\vec{Y}$ can be calculated by the following equation (step 260):

$$d(\vec{X}, \vec{Y}) = \frac{1}{2}(n - \langle Q\vec{X}, \vec{Z} \rangle)$$

If the calculated hamming distance is within a predetermined value, the secret information inputted in the terminal 20, which is requested for authentication, is authenticated and otherwise, it is determined that the authentication fails (step 270). The result of authentication can be transmitted to the terminal 20 (step 280).

If the secret information is not a biometric information which can inherently have noise when it is inputted, it can be determined that the authentication is successful only when the hamming distance between $\vec{X}$ and $\vec{Y}$ is "0."

The security level can be improved if at least one of $Q\vec{X}$ and $\vec{Z}$ is encrypted by the public key of the authentication server 30 before it is transmitted to the server 30.

According to another embodiments, at step 130, the vector $\vec{Z}$ can be calculated to satisfy the following relationship:

$$Q^T \vec{Z} = \vec{Y} + \vec{e},$$

where $\vec{e}$ is a noise vector of small size.

The noise vector has the elements which are randomly selected from $\mathbb{Z}_q^n$ in LWE problem. "q" is a positive integer. According to the embodiment, the authentication server 30 calculates the inner product of $Q\vec{X}$ and $\vec{Z}$ and then calculates the hamming distance between $\vec{X}$ and $\vec{Y} + \vec{e}$ using the inner product of $Q\vec{X}$ and $\vec{Z}$.

The vectors $\vec{X}$ and $\vec{Y} + \vec{e}$ satisfies the following relationship:

$$\langle \vec{X}, \vec{Y} + \vec{e} \rangle = \langle \vec{X}, \vec{Y} \rangle + \langle \vec{X}, \vec{e} \rangle \qquad \text{[Mathematical Equation 3]}$$

This means that $\langle \vec{X}, \vec{Y} + \vec{e} \rangle$ can be the approximate value of $\langle \vec{X}, \vec{Y} \rangle$, which has a small error of $\langle \vec{X}, \vec{e} \rangle$. Therefore, $\langle \vec{X}, \vec{Y} + \vec{e} \rangle$ can be used for authentication of secret information. According to the embodiment, the inputted secret information to be transmitted to the server 30 for request for authentication can be encrypted after a noise is added in LWE problem, thereby improving security level.

Figure 3:
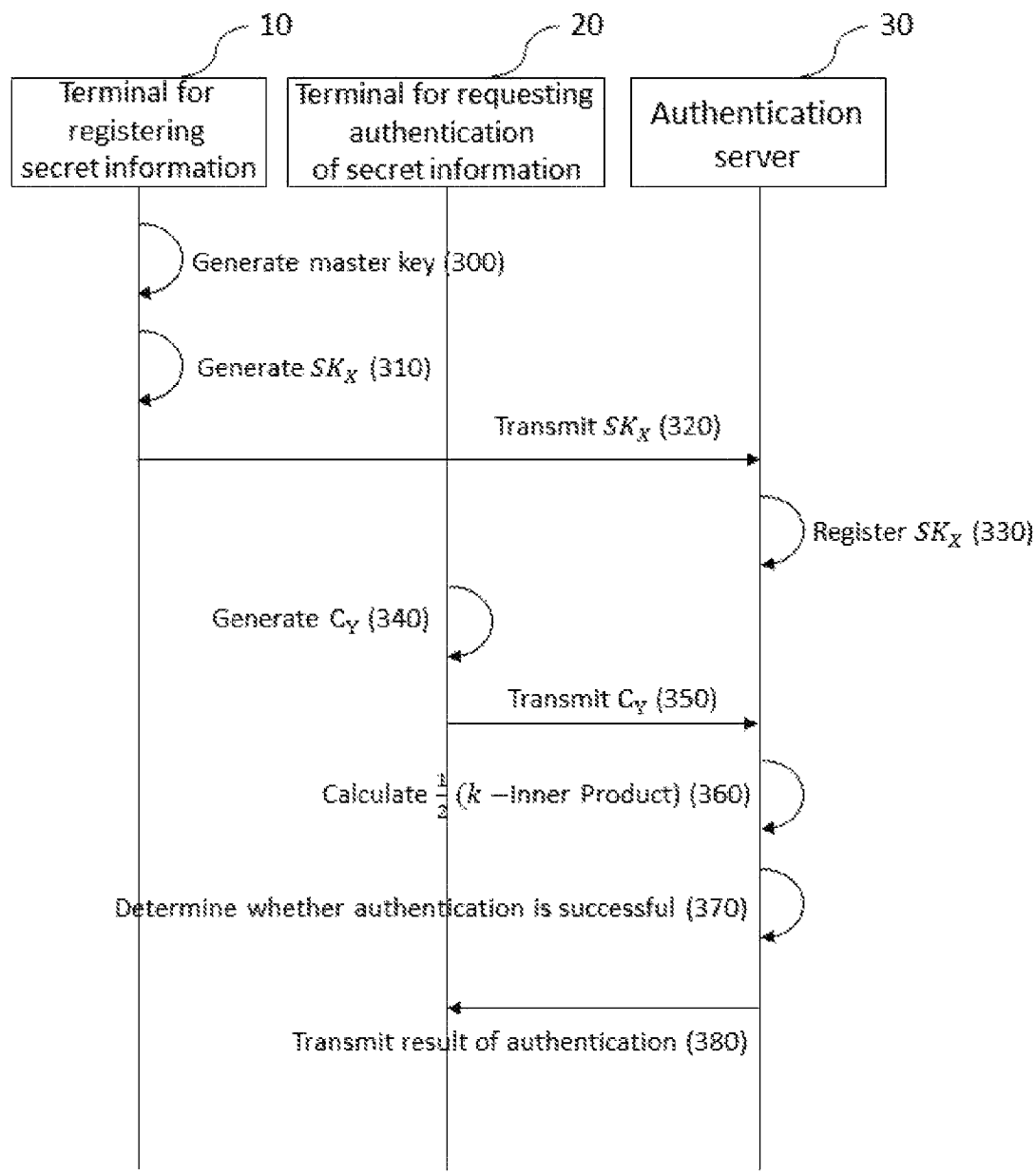
FIG. 3 is a flow chart of authenticating process using secret information according to another aspect of the present disclosure.

FIG. 3 shows a flow chart of method of authenticating secret information according to another aspect of the present disclosure.

At step 300, the terminal for registering secret information 10 generates master key (MSK). If the terminal 10 is separate one from the terminal 20, the terminals 10 and 20 share the master key (MSK). Alternatively, the master key can be stored in a separate place, for example cloud storage, other than the terminal 10 and/or terminal 20. If the master key (MSK) is stored in the separate place, another authentication is needed for using the master key. The master key (MSK) can comprise a random vector a and a random matrix "S" which are defined as following:

$$MSK := \vec{u} \xleftarrow{\$} \mathbb{Z}_q^m; S \xleftarrow{\$} \mathbb{Z}_q^{n \times k} \qquad \text{[Mathematical Equation 4]}$$

$\mathbb{Z}_q := \{0, 1, 2, \ldots q-1\}$ m=n+k

"p," "q," "n," and "m" are positive integers.

The symbol ":=" means that the left of the symbol is defined by the right of the symbol. The symbol "$" means that the elements of the left of the symbol are randomly selected from the right of the symbol.

The security level is determined by "n." The greater "n" is, the greater security level is. Generally, "n" can be determined between 900 and 1,300 for security of 128 bits.

The elements of the matrix "S" can be randomly selected from a subset of $\mathbb{Z}_q$, the elements of which consist of "0" and "1." In that case, the size of the master key (MSK) can be significantly reduced.

The terminal for registering secret information 10 transforms the secret information that a user inputs for registering the secret information into a vector "$\vec{X}$" having a length of "k." The elements of the vector "$\vec{X}$" can consist of "−1" and "1" for authentication using hamming distance.

The elements of the vector "$\vec{X}$" can consist of the elements of $\mathbb{Z}_p^k$. In that case, the authentication can be carried out by use of Euclidean distance.

The terminal for registering secret information 10 generates a ciphertext "$SK_X$" of the inputted secret information for registration by use of the master key (MSK) as follows (step 310):

$$SK_X := \begin{bmatrix} I_k \\ S \end{bmatrix} \vec{X} + \vec{u}, \qquad \text{[Mathematical Equation 5]}$$

where $I_k$ is an identity matrix of k×k.

The ciphertext "$SK_X$" is transmitted to the authentication server 30 (step 320). The authentication server 30 registers the received ciphertext "$SK_X$" (step 330).

A user who wants authentication of secret information provides the terminal for requesting authentication of secret information 20 with his/her secret information.

The terminal for requesting authentication of secret information 20 transforms the secret information that the user inputted for requesting of authentication into a vector "$\vec{Y}$" having a length of "k." The elements of the vector "$\vec{Y}$" can consists of "−1" and "1" for authentication using hamming distance.

As in the vector "$\vec{X}$," the elements of the vector "$\vec{Y}$" can consist of the elements of $\mathbb{Z}_p^k$.

The terminal for requesting authentication of secret information 20 generates the ciphertext "$C_Y$" of the secret information which is inputted for requesting for authentication of the secret information as follows:

$$C_Y := \vec{c_1} = \left( -S^T \vec{a} + \left( \frac{q}{p} \right) \vec{Y} + \vec{e}, \vec{a} \xleftarrow{\$} \mathbb{Z}_q^n \right), \qquad \text{[Mathematical Equation 6]}$$

$$c_0 = -\langle \vec{u}, \vec{c_1} \rangle + e^*$$

"p" is a positive integer which is less than "q."

$\vec{e}$ and $e^*$ are vectors having elements of real numbers which is small. The elements of $\vec{e}$ can be randomly selected from $\mathbb{R}_q^k$ and the elements of $e^*$ can be randomly selected from $\mathbb{R}_q$.

$\mathbb{R}_q := [0, q)$

In this specification, "[" or "]" which is used for indicating the range of numbers inside therebetween means including the number beside it. "(" or ")" which is used for indicating the range of numbers inside therebetween means excluding the number beside it.

In this specification, the aforementioned values of "k," "q," "n," and "p" are determined according to security parameters and are shared with the terminals 10, 20 and the server 30.

The ciphertext "$C_Y$" is transmitted to the authentication server 30 (step 350).

The authentication server 30 calculates the hamming distance between the pre-registered vector of secret information "$\vec{X}$" and the vector of secret information to be requested for authentication "$\vec{Y}$" as follows (step 360):

$$\frac{1}{2}\left( k - \langle \vec{X}, \vec{Y} \rangle \right) = \frac{1}{2}\left( k - \left\lfloor \left( \frac{p}{q} \right)(c_0 + \langle SK_X, \vec{c_1} \rangle) \right\rceil \right) \qquad \text{[Mathematical Equation 7]}$$

⌊number⌋ outputs the rounded number of the number which is included in inside of ⌊ ⌋.

The authentication server 30 determines that the authentication is successful if the hamming distance is within a predetermined value and determines that the authentication fails otherwise (step 370).

The following is for proving that the equation of the hamming distance is true. First of all, "2k" should be less than "p."

We establish the following relationship:

$$v = \left\lfloor \left(\frac{p}{q}\right)(c_0 + \langle SK_X, \vec{c_1}\rangle) \right\rceil ; \begin{bmatrix} l_k \\ S \end{bmatrix} = T$$

Then, the following relationship is established:

$$\langle T\vec{X}, \vec{c_1}\rangle = \langle \vec{X}, T^T\vec{c_1}\rangle$$

The left side can be transformed as follows:

$$\langle T\vec{X}, \vec{c_1}\rangle = \langle SK_X - \vec{u}, \vec{c_1}\rangle = \langle SK_X, \vec{c_1}\rangle - \langle \vec{u}, \vec{c_1}\rangle$$

The right side can be transformed as follows:

$$\langle \vec{X}, T^T\vec{c_1}\rangle = \langle \vec{X}, \left(\frac{q}{p}\right)\vec{Y} + \vec{e}\rangle = \left(\frac{q}{p}\right)\langle \vec{X}, \vec{Y}\rangle + \langle \vec{X}, \vec{e}\rangle$$

Therefore, the following relationship can be satisfied:

$$\langle SK_X, \vec{c_1}\rangle = \langle \vec{u}, \vec{c_1}\rangle + \left(\frac{q}{p}\right)\langle \vec{X}, \vec{Y}\rangle + \langle \vec{X}, \vec{e}\rangle$$

By applying Mathematical Equation 6, the following relationship is satisfied:

$$c_0 + \langle SK_X, \vec{c_1}\rangle = \left(\frac{q}{p}\right)\langle \vec{X}, \vec{Y}\rangle + \langle \vec{X}, \vec{e}\rangle + e^*$$

This equation means that the following is true when $|\langle \vec{X}, \vec{e}\rangle + e^*|$ is bounded by $$\frac{q}{2p}:$$

$$v = \langle \vec{X}, \vec{Y}\rangle (\bmod p)$$

It is desirable that the elements of the error vectors $\vec{e}$ and $e^*$ are selected with low distribution for satisfying the above equation with high probability.

Because "2k" is less than "p," the following relation is satisfied when $v = \langle \vec{X}, \vec{Y}\rangle (\bmod p)$:

$$v = \langle \vec{X}, \vec{Y}\rangle$$

If the elements of the vectors of secret information $\vec{X}, \vec{Y}$ are selected from $\mathbb{Z}_p$, the similarity of the two vectors of the secret information is determined by the Euclidean distance which is calculated based on the hamming distance between $\vec{X}$ and $\vec{Y}$ by the above method. According to the embodiments of the present disclosure, the inner product of two vectors of secret information $\vec{X}$ and $\vec{Y}$ can be calculated from v without disclosing the two vectors. Thus, present disclosure can be applied to any methods which determines the similarity based on the inner product of the vectors. The embodiments of this aspect of the present disclosure is faster than the method related to FIG. 2 which should calculate $\vec{Z}$ which satisfies $Q^T\vec{Z} = \vec{Y}$.

According to the present disclosure, the calculation for authenticating secret information is significantly simple, thereby enabling fast authentication. Further, the size of the master key (MSK) is small to reduce calculation load for authentication.

Although the present disclosure has been described with reference to accompanying drawings, the scope of the present disclosure is determined by the claims described below and should not be interpreted as being restricted by the embodiments and/or drawings described above. It should be clearly understood that improvements, changes and modifications of the present disclosure disclosed in the claims and apparent to those skilled in the art also fall within the scope of the present disclosure. Accordingly, this description is to be taken only by way of example and not to otherwise limit the scope of the embodiments herein.

The invention claimed is:

1. A computer-implemented method for authenticating secret information, the method comprising:

receiving, by an authentication server, $Q\vec{X}$ from a terminal for registering secret information;

storing, by the authentication server, the received $Q\vec{X}$;

receiving, by the authentication server, a vector $\vec{Z}$ from a terminal for requesting authentication of secret information;

calculating, by the authentication server, the inner product of $Q\vec{X}$ and $\vec{Z}$;

calculating, by the authentication server, ½(n−the inner product); and determining, by the authentication server, that the authentication is successful if ½(n−the inner product) is within a predetermined value and that the authentication fails otherwise, wherein $\vec{X}$ is a vector, having a length of n, of secret information to be registered, the elements of which consists of $\{-1, 1\}^n$; Q is a matrix having m rows and n columns where m>n, the elements of which is randomly selected from $\mathbb{Z}_q^{m \times n}$; $\vec{Y}$ is a vector of secret information to be requested for authentication, the elements of which consists of $\{-1, 1\}^n$; and $\vec{Z}$ is a vector which satisfies $Q^T\vec{Z} = \vec{Y}$ where $Q^T$ is a transpose matrix of the matrix Q, and wherein $\mathbb{Z}_q^{m \times n}$ is defined by $\{0, 1, 2, \ldots q-1\}$; and q, m, and n are positive integers.

2. The computer-implemented method for authenticating secret information according to claim 1, wherein the matrix Q can be deleted after $Q\vec{X}$ is received by the authentication server.

3. The computer-implemented method for authenticating secret information according to claim 1, wherein at least one of $Q\vec{X}$ and $\vec{Z}$ is encrypted before transmission to the authentication server.

4. A computer-implemented method for authenticating secret information, the method comprising:

receiving, by an authentication server, $Q\vec{X}$ from a terminal for registering secret information;

storing, by the authentication server, the received $Q\vec{X}$;

receiving, by the authentication server, a vector $\vec{Z}$ from a terminal for requesting authentication of secret information;

calculating, by the authentication server, the inner product of $Q\vec{X}$ and $\vec{Z}$;

calculating, by the authentication server, ½(n−the inner product); and determining, by the authentication server, that the authentication is successful if ½(n−the inner product) is within a predetermined value and that the authentication fails otherwise, wherein $\vec{X}$ is a vector, having a length of n, of secret information to be registered, the elements of which consist of $\{-1, 1\}^n$; Q is a matrix having m rows and n columns where m>n, the elements of which are randomly selected from $\mathbb{Z}_q^{m \times n}$; $\vec{Y}$ is a vector of secret information to be requested for authentication, the elements of which consist of $\{-1,1\}^n$; $\vec{Z}$ is a vector which satisfies $Q^T\vec{Z}=\vec{Y}+\vec{e}$ where $Q^T$ is a transpose matrix of the matrix Q; and $\vec{e}$ is an error vector having a length of n, the elements of which are randomly selected from $\mathbb{Z}_q^n$, and wherein $\mathbb{Z}_q^{m \times n}$ and $\mathbb{Z}_q^n$ are defined by $\{0, 1, 2, \ldots q-1\}$; and q, m, and n are positive integers.

5. The computer-implemented method for authenticating secret information according to claim 4, wherein the matrix Q can be deleted after $Q\vec{X}$ is received by the authentication server.

6. The computer-implemented method for authenticating secret information according to claim 4, wherein at least one of $Q\vec{X}$ and $\vec{Z}$ is encrypted before transmission to the authentication server.

7. A computer-implemented method for authenticating secret information, the method comprising:

receiving, by an authentication server, a first ciphertext "$SK_X$" of a vector "$\vec{X}$", having a length of k, of secret information to be registered from a terminal for registering secret information;

storing, by the authentication server, the received first ciphertext;

receiving, by the authentication server, a second ciphertext "$C_Y$" of a vector "$\vec{Y}$" of secret information to be requested for authentication of secret information from a terminal for requesting authentication of secret information;

calculating, by the authentication server, the inner product of "$\vec{X}$" and "$\vec{Y}$";

calculating, by the authentication server, a distance for determining similarity based on the inner product; and determining, by the authentication server, that the authentication is successful if the distance is within a predetermined value and that the authentication fails otherwise, wherein the elements of "$\vec{X}$" consist of the elements of $\mathbb{Z}_p^k$; the first ciphertext "$SK_X$" is defined by $$\begin{bmatrix} I_k \\ S \end{bmatrix} \vec{X} + \vec{u},$$

where $I_k$ is an identity matrix of k×k, the elements of the matrix "S" are randomly selected from $\mathbb{Z}_q^{n \times k}$ and the elements of the vector "$\vec{u}$" are randomly selected from $\mathbb{Z}_q^m$; the elements of "$\vec{Y}$" consist of the elements of $\mathbb{Z}_p^k$; the second ciphertext "$C_Y$" is defined by $$C_Y := \vec{c_1} = \left(-S^T\vec{a} + \left(\frac{q}{p}\right)\vec{Y} + \vec{e}, \vec{a} \overset{\$}{\leftarrow} \mathbb{Z}_q^n\right), c_0 = -\langle \vec{u}, \vec{c_1}\rangle + e^*,$$

where $S^T$ is a transpose matrix of the matrix S, the symbol \$ denotes that the elements of the left of the symbol are randomly selected from the right of the symbol, $\vec{e}$ and $e^*$ are vectors having elements of real numbers; the elements of $\vec{e}$ are randomly selected from $\mathbb{R}_q^k$ and the elements of $e^*$ are randomly selected from $\mathbb{R}_q$; and wherein $\mathbb{Z}_q^{n \times k}$, $\mathbb{Z}_q^m$, and $\mathbb{Z}_q^n$ are defined by $\{0, 1, 2, \ldots q-1\}$, $\mathbb{Z}_p^k$ is defined by $\{0, 1, 2, \ldots p-1\}$, and $\mathbb{R}_q$ and $\mathbb{R}_q^k$ are defined by $[0, q)$; p, q, k, n and m are positive integer; q>p; and m=k+n.

8. The computer-implemented method for authenticating secret information according to claim 7, wherein the elements of the error vectors $\vec{e}$ and $e^*$ are selected with less distribution such that $|\langle \vec{X}, \vec{e}\rangle +e^*|$ is less than $$\frac{q}{2p}.$$

9. The computer-implemented method for authenticating secret information according to claim 8, wherein the elements of "$\vec{X}$" and "$\vec{Y}$" consist of −1 or +1; and the distance for determining similarity is the hamming distance between "$\vec{X}$" and "$\vec{Y}$, which is ½ (k−$\langle \vec{X},\vec{Y}\rangle$ ).

10. The computer-implemented method for authenticating secret information according to claim 8, wherein the elements of the matrix "S" are randomly selected from the subset of $\mathbb{Z}_q$ where $\mathbb{Z}_q$ is defined by $\{0, 1, 2, \ldots q-1\}$.

11. The computer-implemented method for authenticating secret information according to claim 7, wherein the elements of "$\vec{X}$" and "$\vec{Y}$" consist of −1 or +1; and the distance for determining similarity is the hamming distance between "$\vec{X}$" and "$\vec{Y}$, which is ½ (k−$\langle \vec{X},\vec{Y}\rangle$ ).

12. The computer-implemented method for authenticating secret information according to claim 7, wherein the elements of the matrix "S" are randomly selected from the subset of $\mathbb{Z}_q$ where $\mathbb{Z}_q$ is defined by $\{0, 1, 2, \ldots q-1\}$.

* * * * *